US012347872B2

(12) United States Patent
Babu et al.

(10) Patent No.: US 12,347,872 B2
(45) Date of Patent: Jul. 1, 2025

(54) IONOMER MEMBRANES FOR FUEL CELLS AND RELATED DEVICES

(71) Applicant: Triad National Security, LLC, Los Alamos, NM (US)

(72) Inventors: Siddharth Komini Babu, Los Alamos, NM (US); Jacob Schatz Spendelow, Los Alamos, NM (US); Rangachary Mukundan, Los Alamos, NM (US); Rodney L. Borup, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 17/060,603

(22) Filed: Oct. 1, 2020

(65) Prior Publication Data

US 2021/0135248 A1     May 6, 2021

Related U.S. Application Data

(60) Provisional application No. 62/931,277, filed on Nov. 6, 2019.

(51) Int. Cl.
*H01M 4/92*     (2006.01)
*H01M 4/86*     (2006.01)
*H01M 4/88*     (2006.01)

(52) U.S. Cl.
CPC ......... *H01M 4/921* (2013.01); *H01M 4/8673* (2013.01); *H01M 4/8882* (2013.01); *H01M 4/8892* (2013.01); *H01M 4/926* (2013.01)

(58) Field of Classification Search
CPC .. H01M 4/481; H01M 4/8673; H01M 4/8882; H01M 4/8892; H01M 4/9083;
(Continued)

(56) References Cited

U.S. PATENT DOCUMENTS 6,524,736 B1 * 2/2003 Sompalli ............. H01M 4/8828
429/535
2003/0232714 A1 * 12/2003 Yan ........................ H01M 4/881
502/101
(Continued)

FOREIGN PATENT DOCUMENTS

JP      H-08148176 A  *  6/1996
JP      2013030289 A  *  2/2013
KR     20170037430 A  *  4/2017

OTHER PUBLICATIONS

Author: Yi Zhang, et al., Title: "Effects of the nanoimprint pattern on the performance of a MEMS-based micro direct methanol fuel cell", J. Micromech. Microeng. 19 015003 (2009), published Nov. 27, 2008 (Year: 2008).*
(Continued)

*Primary Examiner* — Matthew T Martin
*Assistant Examiner* — Jared Hansen

(57) ABSTRACT

Ionomer membranes for fuel cells and related devices are described. An ionomer membrane may be configured with a plurality of anode-side protrusions and/or a plurality of cathode-side protrusions. A filler material(s) may be deposited into voids of an ionomer membrane. Example filler materials include, but are not limited to, platinum (Pt), palladium (Pd), cobalt (Co), nickel (Ni), gold (Au), silver (Ag), iridium (Ir), etc., and their alloys on carbon supports.

5 Claims, 14 Drawing Sheets

(58) Field of Classification Search
CPC .... H01M 4/921; H01M 4/926; H01M 8/1006; H01M 8/1053; H01M 8/1065; H01M 8/1093; Y02E 60/10; Y02E 60/50
See application file for complete search history.

(56) References Cited

U.S. PATENT DOCUMENTS

| | | | |
|---|---|---|---|
| 2005/0181252 A1* | 8/2005 | Risen | H01M 8/1016 429/535 |
| 2006/0040168 A1* | 2/2006 | Sridhar | C30B 23/007 75/952 |
| 2006/0188774 A1* | 8/2006 | Niu | H01M 8/023 429/409 |
| 2006/0204831 A1* | 9/2006 | Yan | H01M 4/8642 427/115 |
| 2006/0216564 A1* | 9/2006 | Arcella | H01M 8/1081 429/535 |
| 2009/0068541 A1* | 3/2009 | Yan | H01M 4/8828 502/101 |
| 2010/0196793 A1* | 8/2010 | Besser | H01M 8/1079 429/479 |
| 2010/0297526 A1* | 11/2010 | Hendricks | H01M 8/1004 428/141 |
| 2010/0304269 A1* | 12/2010 | Kim | H01M 4/8647 429/514 |
| 2011/0001453 A1* | 1/2011 | Goto | H01M 10/44 320/101 |
| 2012/0202682 A1* | 8/2012 | Shirvanian | B01J 35/04 502/300 |
| 2014/0210135 A1* | 7/2014 | Aizawa | H01M 8/1023 264/319 |
| 2015/0354072 A1* | 12/2015 | Suchsland | H01M 8/0245 204/290.01 |
| 2016/0149230 A1* | 5/2016 | Debe | B01J 37/0238 502/4 |
| 2020/0144648 A1* | 5/2020 | Hall | H01M 8/2428 |

OTHER PUBLICATIONS

Grubb, Peter Mack, et al. "Inkjet printing of high performance transistors with micron order chemically set gaps." Scientific reports 7.1 (2017): 1202. (Year: 2017).*

Cavarroc, Marjorie, et al. "Performance of plasma sputtered fuel cell electrodes with ultra-low Pt loadings." Electrochemistry Communications 11.4 (2009): 859-861 (Year: 2009).*

Aizawa, Masato, et al. "Pillar structured membranes for suppressing cathodic concentration overvoltage in PEMFCs at elevated temperature/low relative humidity." Journal of The Electrochemical Society 157.12 (2010): B1844 (Year: 2010).*

Cuynet, S., et al. "Membrane patterned by pulsed laser micromachining for proton exchange membrane fuel cell with sputtered ultra-low catalyst loadings." Journal of Power Sources 298 (2015): 299-308 (Year: 2015).*

Wang, Zhuqing, and Yuki Nagao. "Effects of Nafion impregnation using inkjet printing for membrane electrode assemblies in polymer electrolyte membrane fuel cells." Electrochimica Acta 129 (2014): 343-347 (Year: 2017).*

Cuynet, Stéphane, et al. "Impact of the patterned membrane morphology on PEMFC performances of ultra-low platinum loaded MEAs." International Journal of Hydrogen Energy 42.12 (2017): 7974-7985 (Year: 2017).*

Heinz, Ozge, et al. "Surface-patterning of polymeric membranes: fabrication and performance." Current opinion in chemical engineering 20 (2018): 1-12 (Year: 2018).*

Zhou, Zhilian, et al. "Molded, high surface area polymer electrolyte membranes from cured liquid precursors." Journal of the American Chemical Society 128.39 (2006): 12963-12972 (Year: 2006).*

Jeon, Yukwon, et al. "Interface-designed membranes with shape-controlled patterns for high-performance polymer electrolyte membrane fuel cells." Scientific reports 5.1 (2015): 16394 (Year: 2015).*

Breitwieser, Matthias, et al. "Tailoring the Membrane-Electrode Interface in PEM Fuel Cells: A Review and Perspective on Novel Engineering Approaches." Advanced Energy Materials 8.4 (2018): 1701257 (Year: 2018).*

Deiner, L. Jay, and Thomas L. Reitz. "Inkjet and aerosol jet printing of electrochemical devices for energy conversion and storage." Advanced Engineering Materials 19.7 (2017): 1600878 (Year: 2017).*

Sasikumar, G., et al. "Optimum Nafion content in PEM fuel cell electrodes." Electrochimica Acta 50.2-3 (2004): 601-605 (Year: 2004).*

JPH08148176A, Nonobe, "Reaction layer forming method for fuel cell", machine English translation retrieved from https://worldwide.espacenet.com Date: Mar. 11, 2025 (Year: 1996).*

JP2013030289A, Namba, "Membrane electrode structure for polymer electrolyte fuel cell", machine English translation retrieved from https://worldwide.espacenet.com Date: Mar. 11, 2025 (Year: 2013).*

KR20170037430A, Oh, "Membrane electrode assembly, fuel cell comprising the membrane electrode assembly and method for manufacturing the membrane electrode assembly", machine English translation retrieved from https://worldwide.espacenet.com Date: Mar. 11, 2025 (Year: 2017).*

* cited by examiner

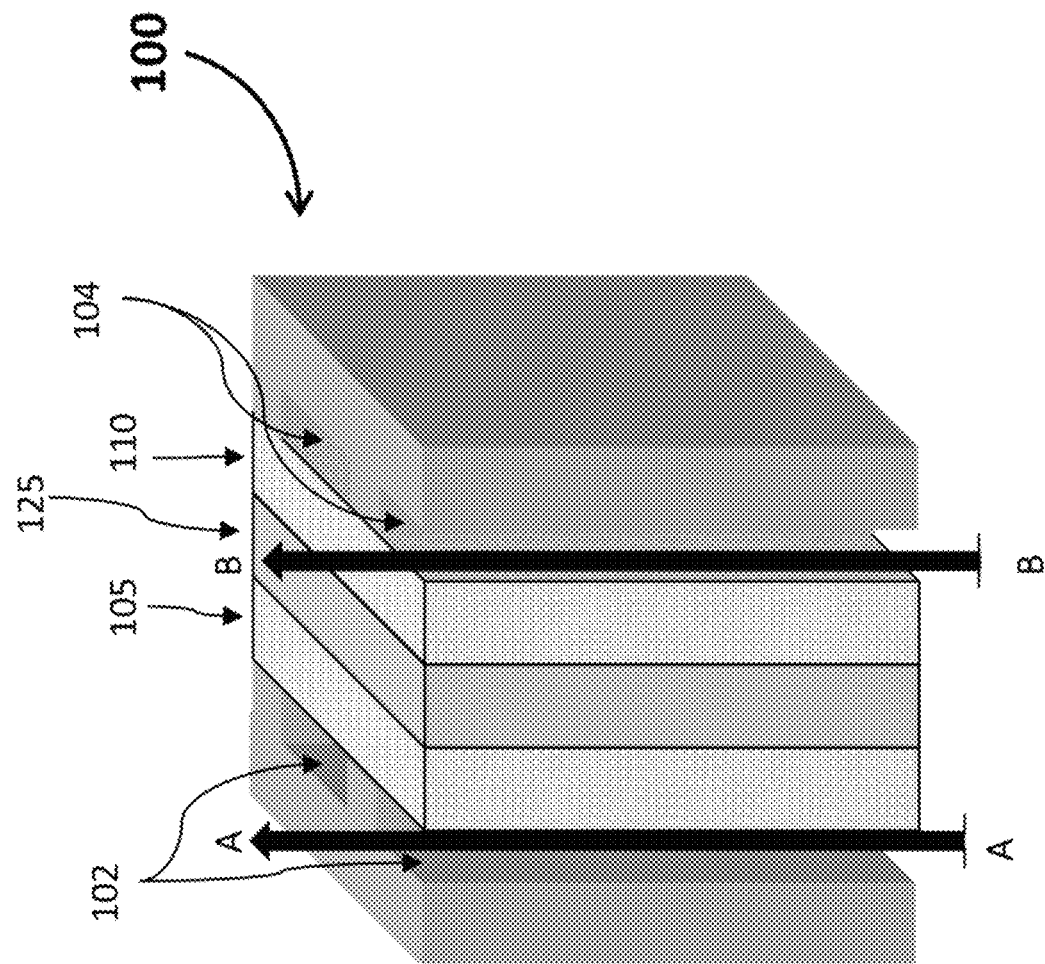

210

220

230

260

240

270

250

280

370A

370B

370C     370D

380A

380B

380C  380D

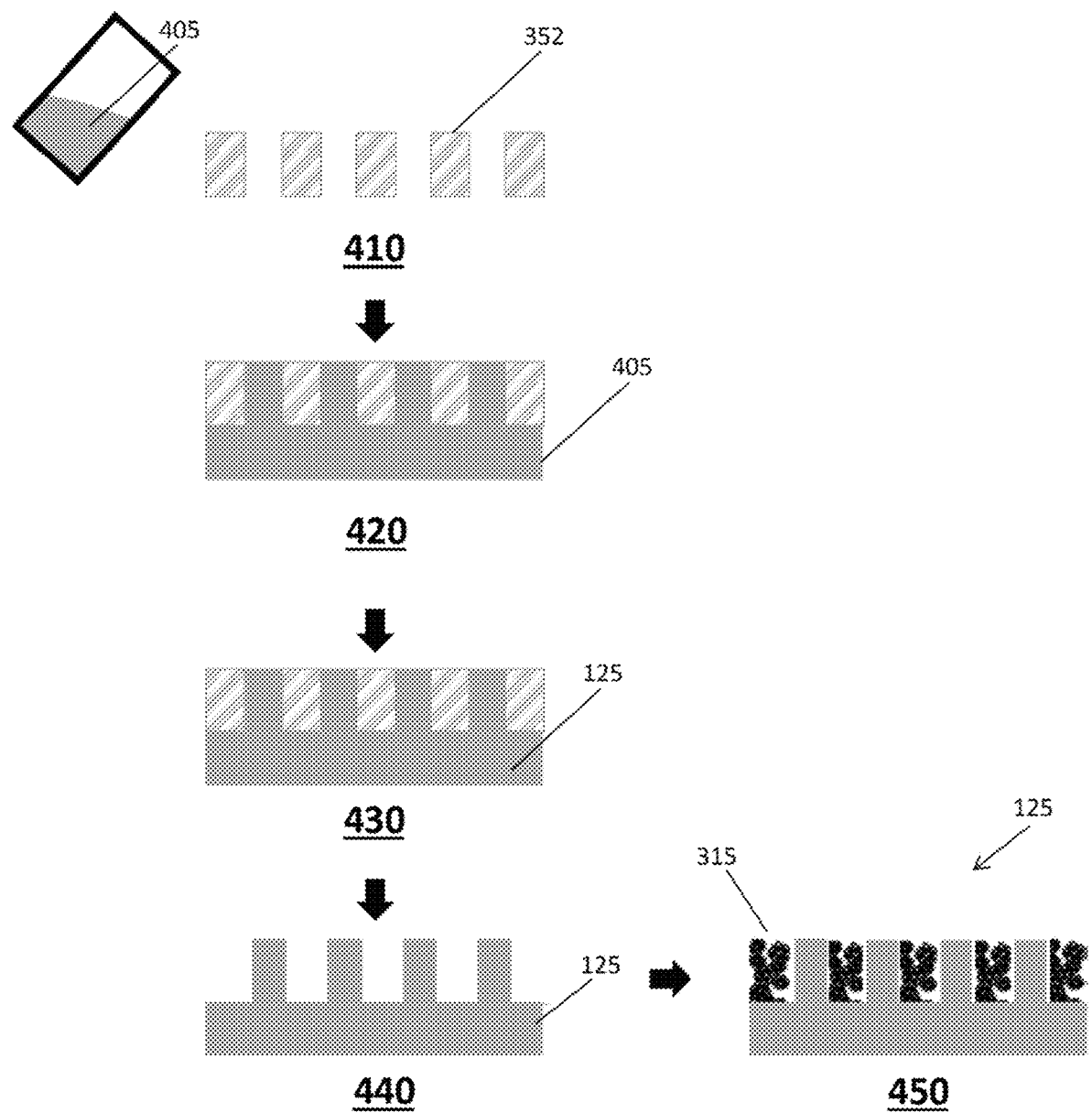

IONOMER MEMBRANES FOR FUEL CELLS AND RELATED DEVICES

CROSS-REFERENCE TO RELATED APPLICATION

This application claims priority to U.S. Provisional Patent Application Ser. No. 62/931,277, titled "ARRAYED IONOMER MEMBRANE FOR FUEL CELLS AND RELATED DEVICES," filed on Nov. 6, 2019, the entirety of which is incorporated herein by reference.

FEDERALLY SPONSORED RESEARCH OR DEVELOPMENT

The United States government has rights in this invention pursuant to Contract No. 89233218CNA000001 between the United States Department of Energy (DOE), the National Nuclear Security Administration (NNSA), and Triad National Security, LLC for the operation of Los Alamos National Laboratory.

BACKGROUND

A fuel cell is an electrochemical cell that converts potential energy from a fuel into electrical energy through an electrochemical reaction. A specific type of fuel cell is a polymer electrolyte fuel cell (PEFC), which may be used to power electric vehicles, for residential uses, as well as other uses.

PEFCs use the oxidation of hydrogen, methanol, or other fuel to release protons ($H^+$). The protons are transported across an electrolyte to a cathode where the protons react with oxygen to produce water. Electrons are transported via an external circuit from the anode to the cathode of the PEFC, providing power to external devices.

Generally, in PEFCs a membrane is positioned between the anode and the cathode to form a membrane-electrode assembly. The membrane-electrode assembly may include a proton-conducting membrane electrolyte with a composite catalyst layer adjacent to each of its surfaces.

Specifically, a catalyst layer may include a relatively high loading of platinum (Pt) or Pt-alloy on carbon supports. Pt/C powder may be prepared using colloid chemistry, which refers to the suspension of one substance of microscopically dispersed insoluble particles throughout another substance. The Pt permits the electrochemical conversion of hydrogen and oxygen at the anode and cathode, respectively, into electric current (i.e., electric power).

The Pt/C powder may be intermixed with an ionomer to provide ionic conductivity within a catalyst layer. In other words, the catalyst layer may be referred to as a Pt/C/ionomer composite.

In at least some instances, the membrane-electrode assembly may be formed in an uncontrolled ink deposition process that produces random aggregates of catalyst, ionomer, and pore volume. The high tortuosity and poor percolation of ionomer in these random aggregates causes low effective conductivity, requiring the use of high ionomer content to minimize ohmic losses due to proton conduction. This results in significant mass transport limitations during high-power operation, resulting in performance loss and requiring a high loading and active area of Pt to maintain an acceptable level of performance.

Moreover, the randomly aggregated ionomer may add an additional transport resistance because reactants must diffuse through a thicker ionomer film. This may become a significant cause of poor performance at lower Pt loadings. The ionomer may also poison the surface of the catalyst, reducing activity of the catalyst.

SUMMARY

An aspect of the present disclosure relates to an ionomer membrane for use in fuel cells and related devices. The ionomer membrane includes an ionomer including a plurality of protrusions defining at least one void, and at least one filler material located within the at least one void. In at least some embodiments, the at least one filler material includes at least one metal supported on a catalyst support. In at least some embodiments, the at least one filler material includes at least one of platinum (Pt), Pt alloy, gold (Au), Au alloy, silver (Ag), Ag alloy, iridium (Ir), Ir alloy, palladium (Pd), Pd alloy, cobalt (Co), Co alloy, nickel (Ni), or Ni alloy supported on a carbon catalyst support. In at least some embodiments, a first protrusion, of the plurality of protrusions, has a width of about 100 nm to about 30,000 nm, and a height of about 0.5 µm to about 200 µm. In at least some embodiments, a first protrusion, of the plurality of protrusions, has a height to width aspect ratio of about 1:1 to about 60:1.

Another aspect of the present disclosure relates to a method of making an ionomer membrane for use in fuel cells and related devices. The method includes providing an ionomer solution; providing a template including a plurality of holes; casting the ionomer solution onto the template to produce a cast ionomer solution; drying and annealing the cast ionomer solution to produce an ionomer membrane including a plurality of protrusions defining at least one void; separating the ionomer membrane from the template; and, after separating the ionomer membrane from the template, depositing at least one filler material within the at least one void. In at least some embodiments, the ionomer solution includes at least one of a sulfonated tetrafluoroethylene based fluoropolymer-copolymer, perfluorosulfonic acid (PFSA), or perfluoroimide acid (PFIA). In at least some embodiments, the ionomer solution includes at least one of water, 2-propanol, methanol, ethanol, glycerol, ethylene glycol, 1,2-propanediol, 1,3,-propanediol, or N-methyl-2-pyrrolidone. In at least some embodiments, drying and annealing the cast ionomer solution includes drying the cast ionomer solution at room temperature for about 24 hours to produce a dried ionomer, and annealing the dried ionomer in a vacuum oven for about 2 hours and at about 140° C. to produce the ionomer membrane. In at least some embodiments, the at least one filler material includes at least one of platinum (Pt), Pt alloy, gold (Au), Au alloy, silver (Ag), Ag alloy, iridium (Ir), Ir alloy, palladium (Pd), Pd alloy, cobalt (Co), Co alloy, nickel (Ni), or Ni alloy supported on a carbon catalyst support. In at least some embodiments, depositing the at least one filler material includes at least one of painting the at least one filler material into the at least one void; rod coating the at least one filler material by sliding a smooth, grooved, or wire-wound bar over the at least one void; or spraying the at least one filler material into the at least one void.

A further aspect of the present disclosure relates to a method of making an ionomer membrane for use in fuel cells and related devices. The method includes providing solid ionomer; providing a template including a plurality of holes; hot pressing the solid ionomer onto the template to produce an ionomer membrane including a plurality of protrusions defining at least one void; separating the ionomer membrane from the template; and, after separating the ionomer membrane from the template, depositing at least one filler material within the at least one void. In at least some embodiments, the solid ionomer includes at least one of a sulfonated tetrafluoroethylene based fluoropolymer-copolymer, perfluorosulfonic acid (PFSA), or perfluoroimide acid (PFIA). In at least some embodiments, the solid ionomer is hot pressed at about 120° C. In at least some embodiments, the solid ionomer is hot pressed at about 2000 psi. In at least some embodiments, the solid ionomer is hot pressed for about 20 minutes. In at least some embodiments, the at least one filler material includes at least one metal. In at least some embodiments, the at least one filler material includes at least one of platinum (Pt), Pt alloy, gold (Au), Au alloy, silver (Ag), Ag alloy, iridium (Ir), Ir alloy, palladium (Pd), Pd alloy, cobalt (Co), Co alloy, nickel (Ni), or Ni alloy supported on carbon catalyst support. In at least some embodiments, depositing the at least one filler material includes at least one of painting the at least one filler material into the at least one void; rod coating the at least one filler material by sliding a smooth, grooved, or wire-wound bar over the at least one void; or spraying the at least one filler material into the at least one void. In at least some embodiments, separating the ionomer membrane from the template includes dissolving the template.

BRIEF DESCRIPTION OF DRAWINGS

For a more complete understanding of the present disclosure, reference is now made to the following description taken in conjunction with the accompanying drawings.

FIG. 1A is a three dimensional sketch view of a polymer electrolyte fuel cell (PEFC), according to embodiments of the present disclosure.

FIGS. 4A-4B illustrates solution-based fabrication of an ionomer membrane, according to embodiments of the present disclosure.

DETAILED DESCRIPTION

Overview

The present disclosure provides ionomer membranes that may be incorporated into fuel cells [e.g., polymer electrolyte fuel cells (PEFCs)] and related devices. As used herein, an "ionomer" refers to a polymer having repeating electrically neutral unit and ionized units covalently bonded to a polymer backbone. In at least some embodiments, an ionomer of the present disclosure may be a thermoplastic resin stabilized by ionic cross-linkages. That is, an ionomer of the present disclosure may be a polymer Example ionomers that may be used in accordance with the present disclosure include, but are not limited to, perfluorosulfonic acid (PFSA) ionomer, hydrocarbon acidic ionomer, and alkaline ionomer.

An ionomer membrane of the present disclosure includes a plurality of protrusions (sometimes referred to as pillars or ridges) on an anode- and/or cathode-side thereof. In at least some embodiments, the plurality of protrusions, on a side of the ionomer membrane, may be configured in an array (i.e., an ordered series or arrangement).

An ionomer membrane of the present disclosure may provide enhanced protonic conductivity in the associated electrodes while enabling reduced ionomer content (e.g., due to channels being formed between protrusions of the ionomer membrane). The reduction in ionomer content can reduce oxygen ($O_2$) transport resistance while also improving electrode kinetics due to reduced ionomer poisoning, which is the partial or total deactivation of the catalyst by adsorbed ionomer. The protrusions, of an ionomer membrane of the present disclosure, can also facilitate ionic conductivity in low relative humidity conditions. The foregoing characteristics of an ionomer member of the present disclosure provides improved performance compared to a baseline, flat membrane.

In at least some embodiments, protrusions (and one or more corresponding voids) may be formed in an ionomer membrane by pressing solid ionomer onto a porous template, or by impregnating a porous template with a solution including ionomer. The resulting ionomer protrusions may have a relatively high roughness factor (i.e., a ratio of total surface area to geometrical area). It will be appreciated that the herein disclosed techniques for generating protrusions in an ionomer membrane may be extended to polymer membranes with a broad range of protrusion aspect ratios.

In at least some embodiments, filler material, such as a catalyst, may be provided within one or more voids of an ionomer membrane of the present disclosure. Example filler materials include, but are not limited to, platinum (Pt), palladium (Pd), cobalt (Co), nickel (Ni), gold (Au), silver (Ag), iridium (Ir), etc., and their alloys.

Polymer Electrolyte Fuel Cells (PEFCs)

A PEFC of the present disclosure may have the structure of an electrochemical cell. That is, a PEFC may have an electrode/electrolyte/electrode architecture, such as that illustrated in FIGS. 1A-1C.

Figure 1B:
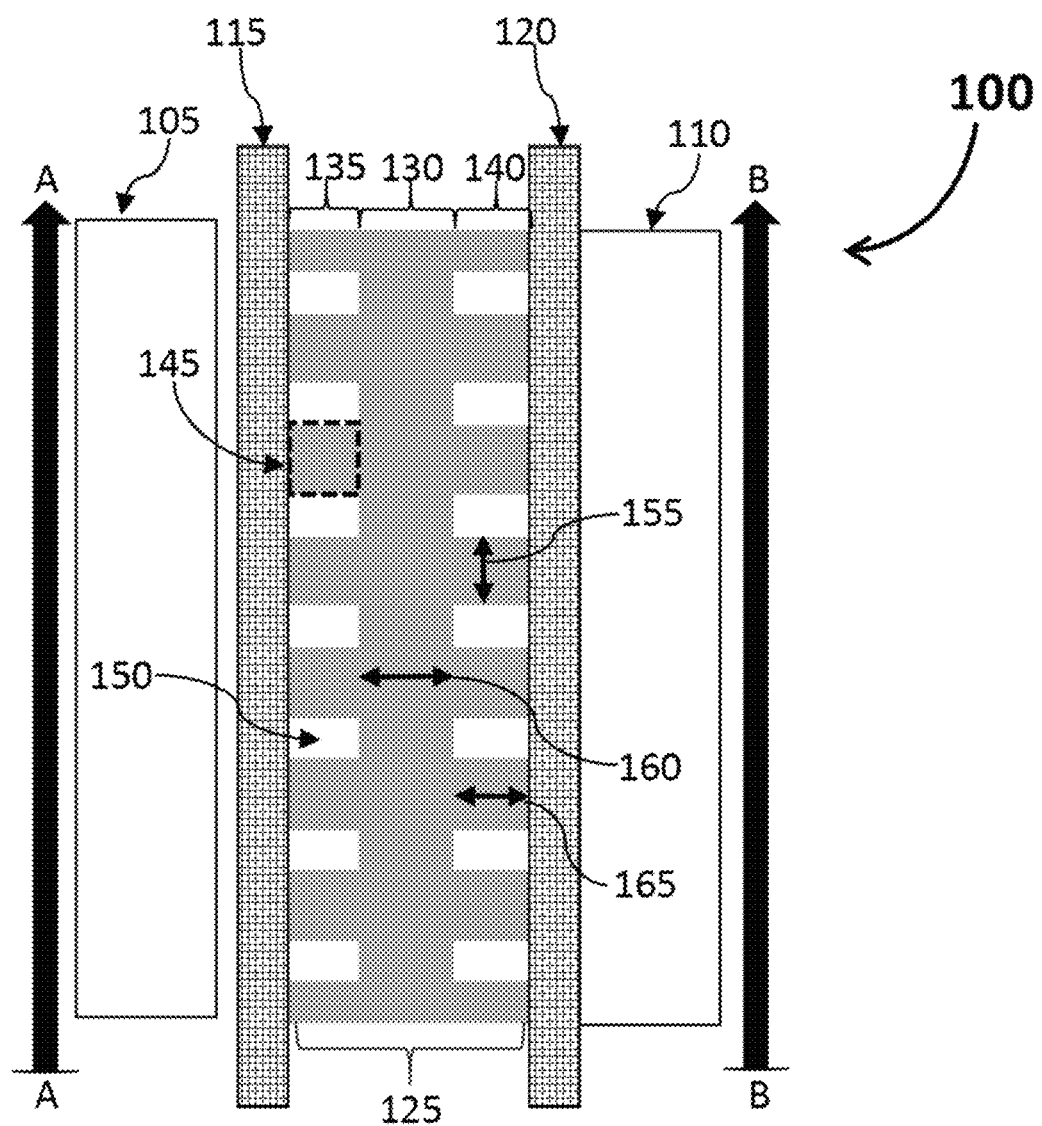
FIG. 1B is a two dimensional cross-sectional view of a PEFC, according to embodiments of the present disclosure.

FIGS. 1A-1B are two views of a PEFC 100 according to at least some embodiments of the present disclosure. As illustrated, the PEFC 100 includes an anode-side flow channel(s) 102, an anode 105, an ionomer membrane 125, a cathode 110, and a cathode-side flow channel(s) 104. The anode 105 and the cathode 110 may each be referred to as an "electrode," and collectively as "electrodes."

The anode 105 may include an anode gas-diffusion layer (or "backing") 115 (illustrated in FIG. 1B). Similarly, the cathode 110 may include a cathode gas-diffusion layer 120. Generally, the gas-diffusion layers 115/120 may allow for reactant transport and heat/water removal, provide mechanical support to the membrane electrode assembly, and provide protection to the catalyst layer from corrosion or erosion. The gas-diffusion layers 115/120 may be a porous material having a dense array of carbon fibers. Example gas-diffusion layers are carbon paper (a non-woven material) and carbon cloth (a woven fabric). The gas-diffusion layers 115/120 may be wet-proofed by treatment with polytetrafluoroethylene (PTFE).

The anode-side flow channel(s) 102 and the cathode-side flow channel(s) 104 provide channels for the flow of reactant gases in the directions A-A and B-B adjacent to the corresponding electrode. For example, in a hydrogen/air fuel cell, hydrogen gas ($H_2$) is passed through the anode-side flow channel(s) 102, and oxygen gas ($O_2$) is passed through the cathode-side flow channel(s) 104. One or more of the flow channels 102/104 may include a current collector plate, which may be made of, for example, graphite, stainless steel, aluminum, titanium, or composite materials.

Generally, the anode 105 is a negative electrode at which oxidation occurs. At the anode 105, the anode side reactant gas (e.g. $H_2$) undergoes an oxidation reaction that generates protons and electrons. In a hydrogen/air fuel cell, $H_2$ may be fed through the anode-side flow channel(s) 102 along the anode 105 in the direction of arrow A-A, resulting in the oxidation reaction represented by Equation 1.

$$H_2 = 2H^+ + 2e^- \qquad \text{Equation 1}$$

The anode 105 may be made of one or more materials capable of causing such an oxidation reaction. Non-limiting examples of types and compositions of the anode 105 include, for example, Pt and Pt-alloy nanoparticles supported on carbon (high surface area carbon, Vulcan, etc.) bound by ionomer like PFSA; Pt black bound by ionomer or other polymer; and a mixture of the Pt supported carbon and Ir, iridium oxide ($IrO_2$), or other catalysts.

Generally, the cathode 110 is a positive electrode at which reduction occurs. In a hydrogen/air fuel cell, $O_2$ may be fed through the cathode-side flow channel(s) 104 along the cathode 110 in the direction of arrow B-B. At the cathode 110, hydrogen ions, electrons, and $O_2$ gas to react to form water, which is represented by Equation 2.

$$O_2 + 4e^- + 4H^+ = 2H_2O \qquad \text{Equation 2}$$

The cathode 110 may be made of one or more materials capable of causing such a reduction reaction. Non-limiting examples of types and compositions of the cathode 110 include, for example, Pt and Pt-alloy nanoparticles supported on carbon (high surface area carbon, Vulcan, etc.) bound by ionomer like PFSA; Pt black bound by ionomer or other polymer; and ionomer free Pt deposited via physical vapor or chemical vapor deposition or atomic layer deposition methods.

An ionomer membrane 125 is positioned between the anode 105 and the cathode 110. Generally, the ionomer membrane 125 enables protons from the anode 105 to be transferred to the cathode 110.

Ionomer Membranes

The ionomer membrane 125 may be made of one or more commercially available and/or one or more proprietary ionomers. Example ionomers that may be included in the ionomer membrane include, but are not limited to PFSA, perfluoroimide acid (PFIA), sulfonated hydrocarbon ionomers, and high temperature ionomers such as phosphoric acid doped polybenzimidazole. In at least some embodiments, the ionomer membrane 125 may include one or more thermoplastic polymers such as, for example, Nafion™ (a sulfonated tetrafluoroethylene based fluoropolymer-copolymer produced by The Chemours Company), Nafion™ 211 (The Chemours Company), Nafion™ XL (The Chemours Company), Nafion™ HP (The Chemours Company), Aquivion® (a short-side-chain copolymer of tetrafluoroethylene and the sulfonyl fluoride vinyl ether (SFVE) $CF_2=CF_2$—O—$(CF_2)_2$—$SO_2F$, produced by Solvay Specialty Polymers), and Flemion™ (a fluorinated membrane available from AGC Chemicals Company).

Figure 1C:
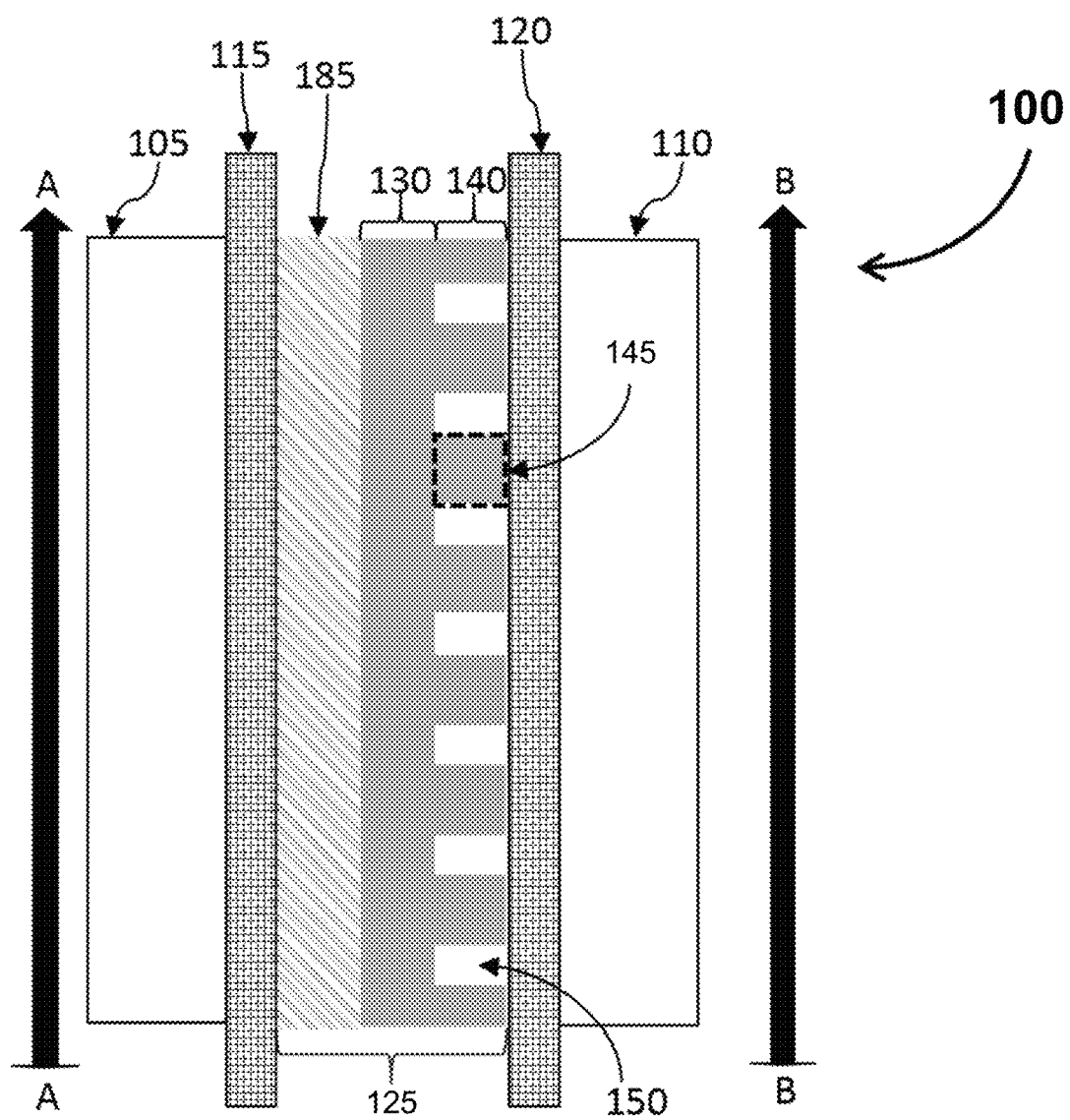
FIG. 1C is a two dimensional cross-sectional view of a PEFC, according to embodiments of the present disclosure.

As illustrated in FIG. 1B, the ionomer membrane 125 may include a backbone portion 130, a plurality of anode-side protrusions 135 extending from an anode-side of the backbone portion 130, and a plurality of cathode-side protrusions 140 extended from the cathode-side of the backbone portion 130. Depending on the number and positioning of protrusions extending from a side of the backbone portion 130, one or more voids 150 may be positioned between protrusions of the side of the backbone portion 130. In FIGS. 1B-1C, the dashed box referenced 145 is used to indicate a single protrusion of the ionomer membrane 125.

In at least some embodiments, the ionomer membrane 125 may be configured with protrusions on one side of the backbone portion 130. For example, as illustrated in FIG. 1C, the ionomer membrane 125 may include the backbone portion 130 and the plurality of cathode-side protrusions 140, but not the plurality of anode-side protrusions 135. Alternatively (not illustrated), the ionomer membrane 125 may include the backbone portion 130 and the anode-side protrusions 135, but not the cathode-side protrusions 140.

As illustrated in FIG. 1C, when the ionomer membrane 125 does not include the anode-side protrusions 135, the PEFC 100 may include an anode-side catalyst later 185 positioned between the anode 105 and the ionomer membrane 125. When the ionomer membrane 125 does not include the cathode-side protrusions 140, the PEFC 100 may include a cathode-side catalyst layer positioned between the cathode 110 and the ionomer membrane 125. The foregoing catalyst layers may be similar to those used in known PEFCs.

In at least some embodiments, a filler material(s) may be located in one or more voids 150 of the ionomer membrane 125. In at least some embodiments, the filler material(s) may include one or more metals supported on a catalyst support(s). Example metals include, but are not limited to, Pt, Pd, Co, Ni, Au, Ag, Ir, and alloys thereof. Example catalyst supports include various types of carbon (e.g., Vulcan, high surface area carbon, graphitized carbon, and/or acetylene black). In at least some embodiments, the metal particles may be on the size of about 2 nm to about 8 nm. In at least some embodiments, the carbon support may have a size of about 30 nm to about 100 nm. In at least some embodiments, the metal loading on the carbon support may be about 5 wt % to about 60 wt % of the total weight of the filler material.

The function of the filler material(s) may depend on the composition of the filler material(s). A filler material may, in at least some embodiments, provide enhanced gas transport and/or enable improved water management. In an example, wettability of the filler material(s) may depend on an amount of $SiO_2$ particles present in the filler material(s). In another example, the filler material(s) may include $IrO_2$, which is a catalyst for water electrolysis, enabling utilization for reversible fuel cell operation.

It is noted that the parts of the PEFC 100, illustrated in FIGS. 1A-1B, are not necessarily to scale. In particular, the height 165 and width 155 of the protrusions 135/140 (respectively marked by double headed arrows) may not be of the same scale as the width 160 of the backbone portion 130 (marked by a double headed arrow) as they appear in FIGS. 1A-1C. In at least some embodiments, the width 160 of the backbone portion 130 may be in the range of about 5 μm to about 100 μm, while the height 165 of the protrusions 135/140 may be in the range of about 0.5 μm to about 200 μm, and the width 155 of the protrusions 135/140 may be in the range of about 100 nm to about 30,000 nm. Moreover, while the protrusions 135/140 are shown to protrude perpendicularly from the backbone portion 130, in at least some embodiments one or more protrusions 135/140 may extend approximately perpendicularly from the backbone portion 130. In at least some embodiments, one or more of the protrusions 135/140 may extend from the backbone portion 130 at an angle of about about 45° and about 135°.

In at least some embodiments, an anode-side void may align with a cathode-side void (as illustrated in FIG. 1B). In at least some other embodiments, an anode-side void may not align with a cathode-side void.

Figure 2A:
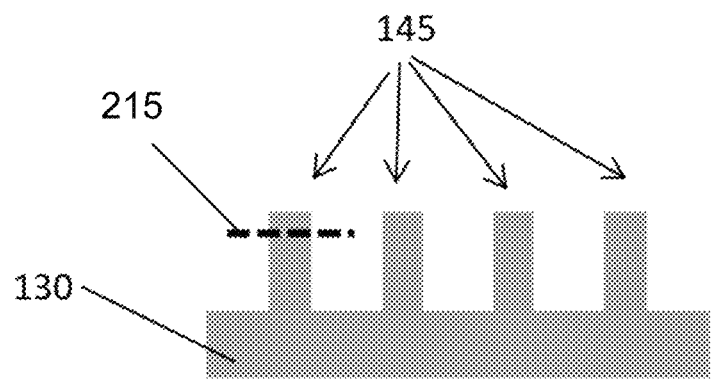
FIGS. 2A-2B illustrate structures and designs of ionomer membranes, according to embodiments of the present disclosure.
Figure 2A:
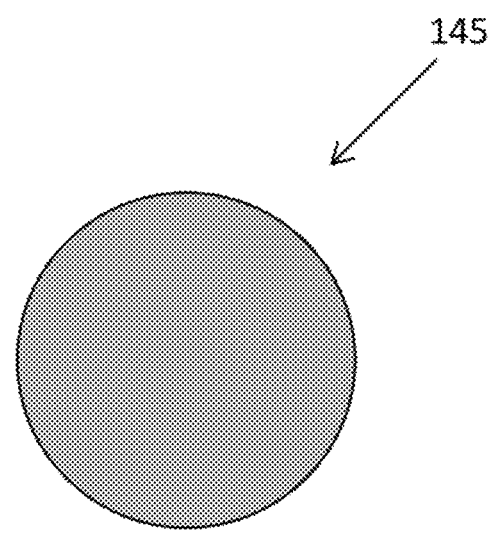
Figure 2B:
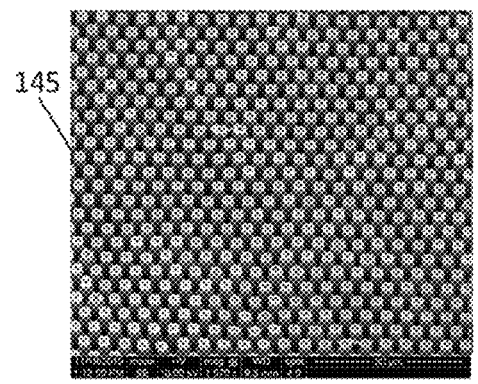
Figure 2B:
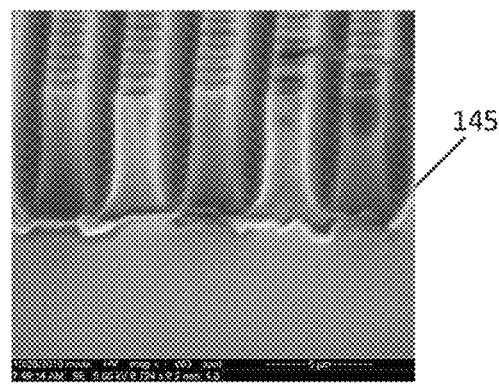
Figure 2B:
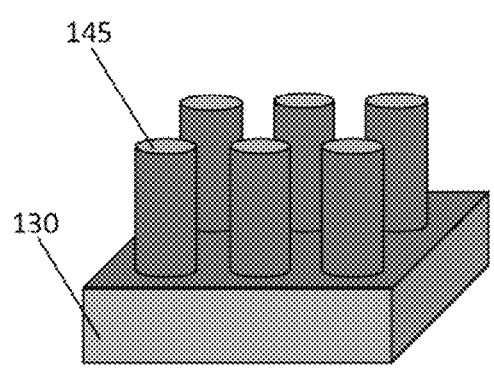
Figure 2B:
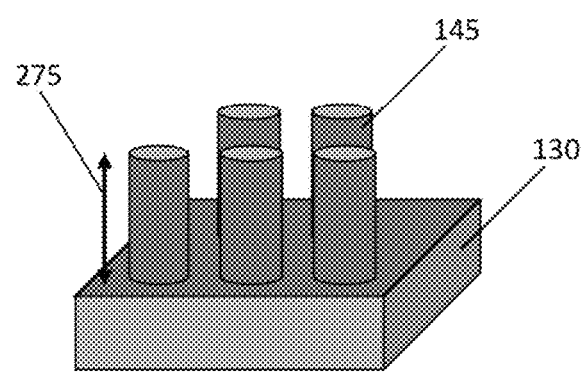
Figure 2B:
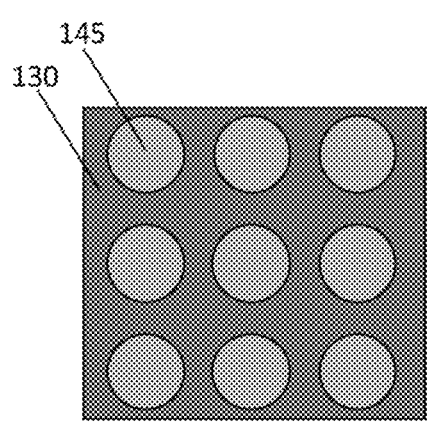
Figure 2B:
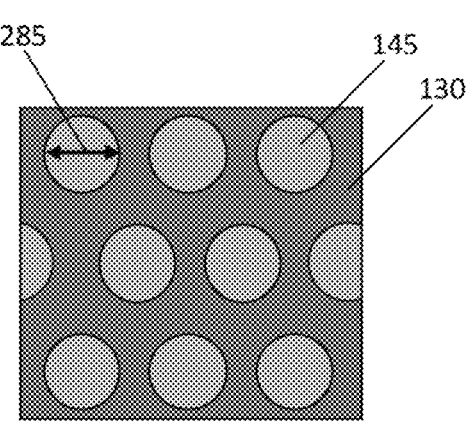

FIGS. 2A-2B illustrate how the ionomer membrane 125 may be structured and designed according to embodiments of the present disclosure. Section 210 of FIG. 2A shows a cross section of the ionomer membrane 125 configured with either anode-side protrusions 135 or cathode-side protrusions 140. Section 210 of FIG. 2A shows a cross section 215 of a protrusion 145. It is noted, viewing sections 210 and 220 together, that the protrusion 145 may be circular in cross section, and cylindrical in shape. However, other cross sections and shapes are envisioned for protrusions of the present disclosure including, but not limited to, square, hexagonal, and circular.

FIG. 2B illustrates two different configurations of the protrusions of the ionomer membrane 125 of the present disclosure. In particular, sections 230, 240, and 250 are respectively a Scanning Electron Microscopic (SEM) image, a 3D schematic view, and a top view of a square configuration of protrusions extending from the backbone portion 130. On the other hand, sections 260, 270, and 280 are respectively an SEM image, a 3D schematic view, and a top view of a hexagonal configuration of protrusions extended from the backbone portion 130.

The protrusions may have different aspect ratios than those illustrated in FIG. 2B. The aspect ratio of a protrusion is the ratio of the protrusion's height 275 to the protrusion's width 285. In at least some embodiments, the aspect ratio may range from about 1:1 to about 60:1. A higher aspect ratio may lead to a higher surface area or surface roughness, which may in turn be beneficial due to increased interface between the ionomer membrane 125 and filler material(s) positioned in the void(s) of the ionomer membrane.

The protrusions may have various distances between them. In at least some embodiments, a distance (measured between the centers of two adjacent protrusions) may be about 0.2 μm to about 100 μm.

The protrusions may have various thicknesses. In at least some embodiments, a protrusion may have a width (or diameter) of about 100 nm to about 30,000 nm.

The protrusions may have various heights. In at least some embodiments, a protrusion may have a height of about 0.5 μm to about 200 μm.

Template-Based Fabrication of Ionomer Membranes

Figure 3A:
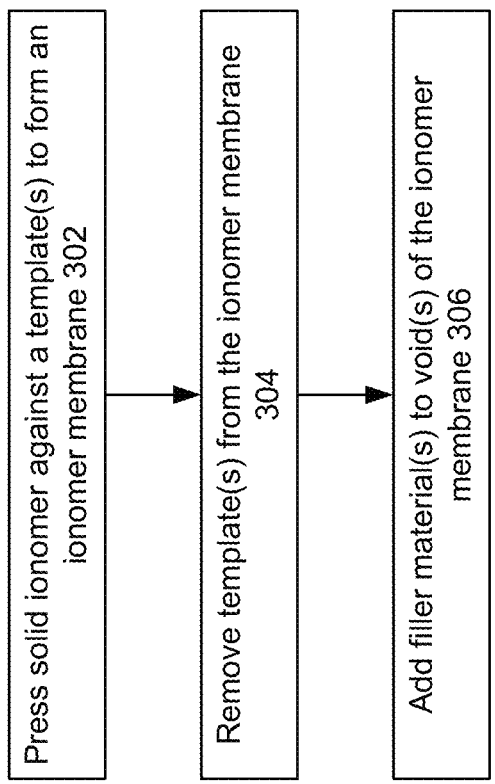
FIGS. 3A-3D illustrate template-based fabrication of an ionomer membrane, according to embodiments of the present disclosure.

FIGS. 3A-3D illustrate a template-based method of fabricating ionomer membranes according to the present disclosure. Referring to FIG. 3A, the fabrication of an ionomer membrane may begin with pressing (302) a solid ionomer against a template(s) to form an ionomer membrane 125. A template may be a commercially available template with pores of controlled diameter.

Figure 3B:
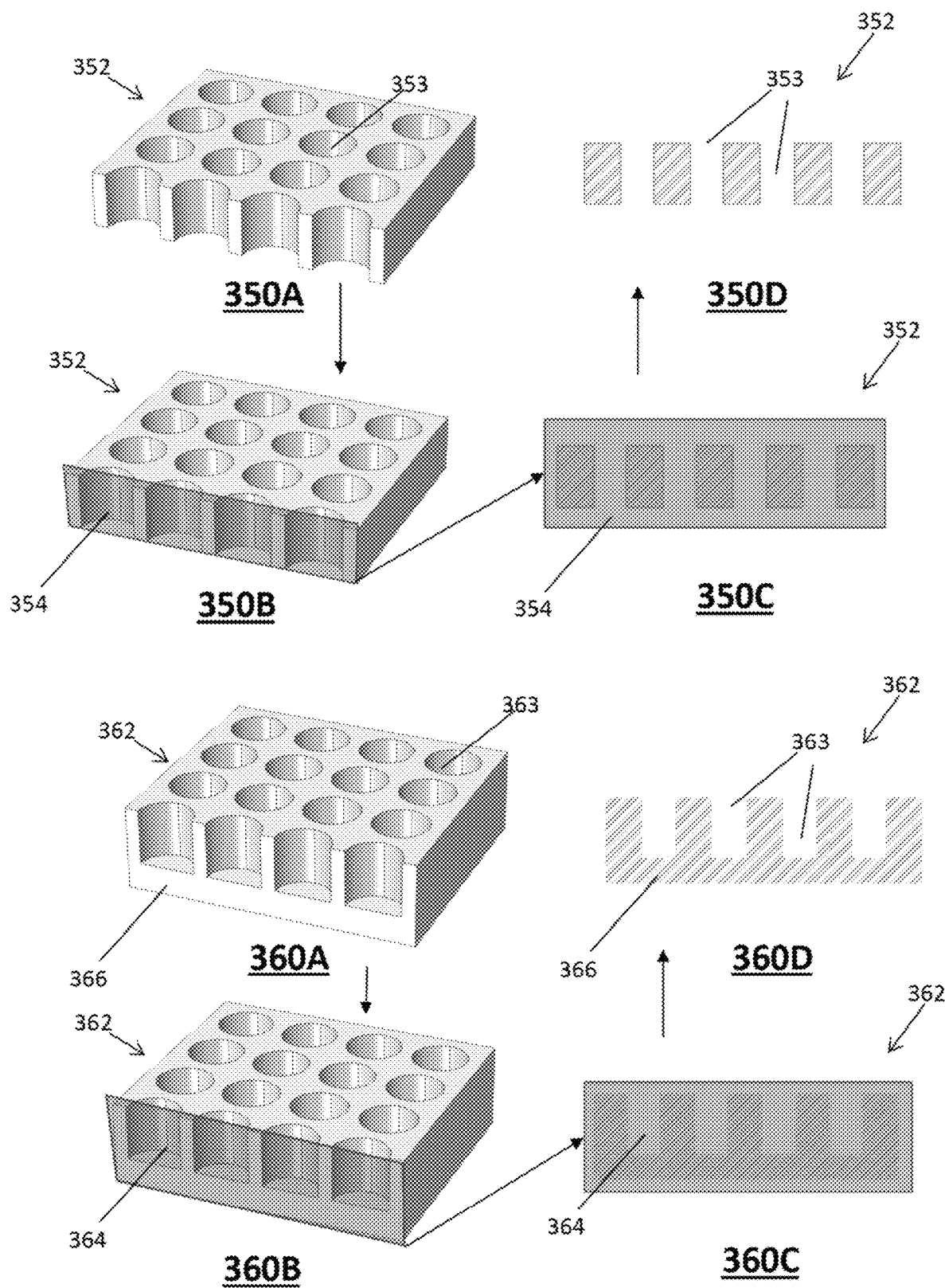

FIG. 3B includes different views of two different templates that may be used in accordance with the present disclosure. In particular, sections 350A and 350B are 3D illustrations of a two-sided template 352, for which the view is concatenated by an imaginary plane 354. The two-sided template 352 defines two-sided holes 353 that span a full thickness of the two-sided template 352. Sections 350C and 350D, on the other hand, are cross-sectional front views of the two-sided template 352, as viewed perpendicular to the imaginary plane 354. Section 350C also shows the imaginary plane 354 for reference.

Sections 360A and 360B are 3D views of a one-sided template 362, for which the view is concatenated by an imaginary plane 364. The one-sided template 362 defines one-sided holes 363 that span part of, but not all of, a thickness of the one-sided template 362. The one-sided template 362, therefore, has a porous face (the top face in sections 360A and 360B) and a non-porous face 366 (the bottom face in sections 360A and 360B). The non-porous face 366 blocks the holes on one end. Sections 360C and 360D are cross-sectional front views of the one-sided template 362, as viewed perpendicular to the imaginary plane 364. Section 360C also shows the imaginary plane 364 for reference.

A template, used at step 302, may be made of one or more materials. For example, a template may be made of anodized aluminum oxide (AAO), anodized titanium oxide, silicon, track-etched polycarbonate (TEP), copper (Cu), aluminum (Al), and/or polyimide.

A hole, of a template used at step 302, may have varying diameters and lengths. In at least some embodiments, a hole may have a dimension on the magnitude of about 0.1 μm to about 30 μm. In one example, a hole may have a diameter of about 750 nm to about 10,000 nm, and a length of about 5 μm. In another example, a hole may have a diameter of about 500 nm and a length of about 30 μm.

Figure 3C:
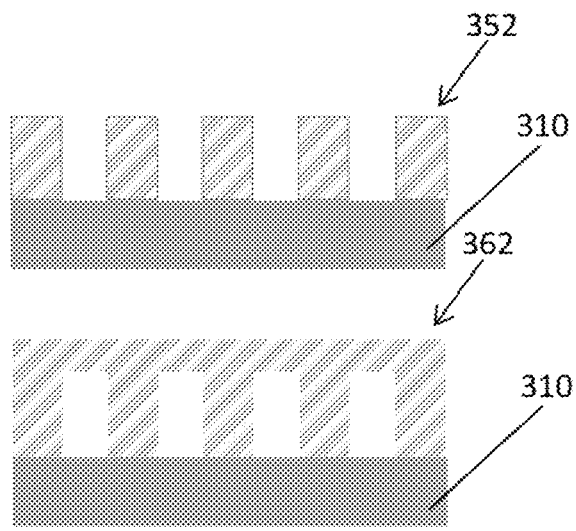
Figure 3C:
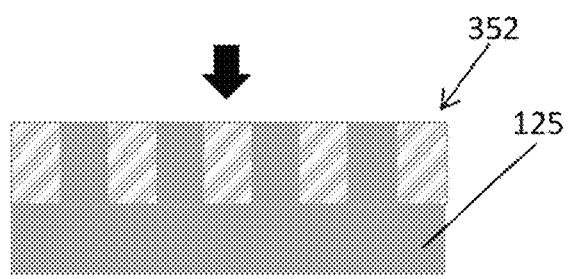
Figure 3C:
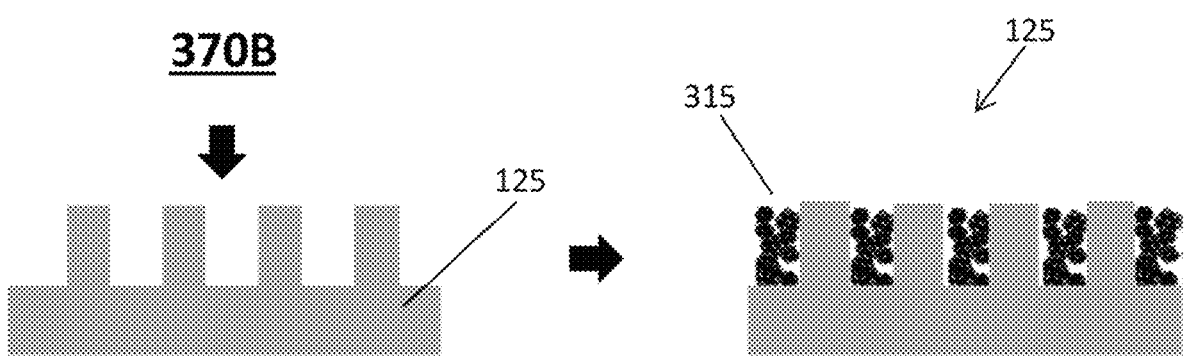

Referring to FIG. 3C, section 370A shows two alternative ways to initiate step 302 of FIG. 3A (i.e., pressing of a solid ionomer against a template to form the ionomer membrane 125). The upper part of section 370A shows the two-sided template 352 placed in contact with a solid ionomer 310, while the lower part of section 370A shows the one-sided template 362 placed in contact with the solid ionomer 310. Regardless of the type of template used, the fabrication of the ionomer membrane 125 may proceed similarly after step 302. Therefore, the remaining sections of FIG. 3C are only illustrated for the two-sided template 352, with the understanding similar subsequent sections are possible with the one-sided template 362. Section 370B shows an ionomer membrane/template construct resulting from the two-sided template 352 being pressed against the solid ionomer 310. Section 370C shows the ionomer membrane 125 with voids and section 370D shows the voids filled with filler material 315, described later.

Figure 3D:
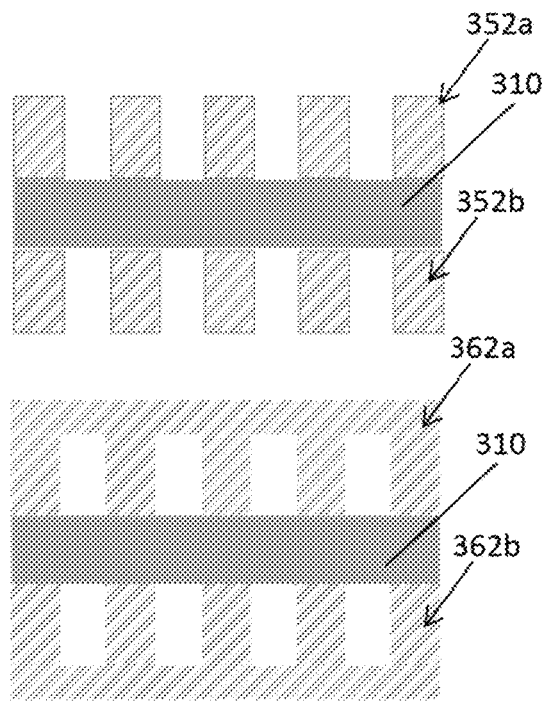
Figure 3D:
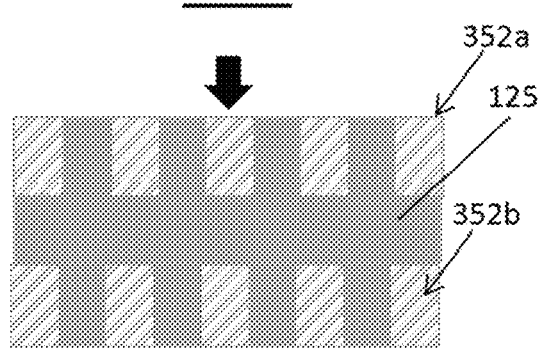
Figure 3D:
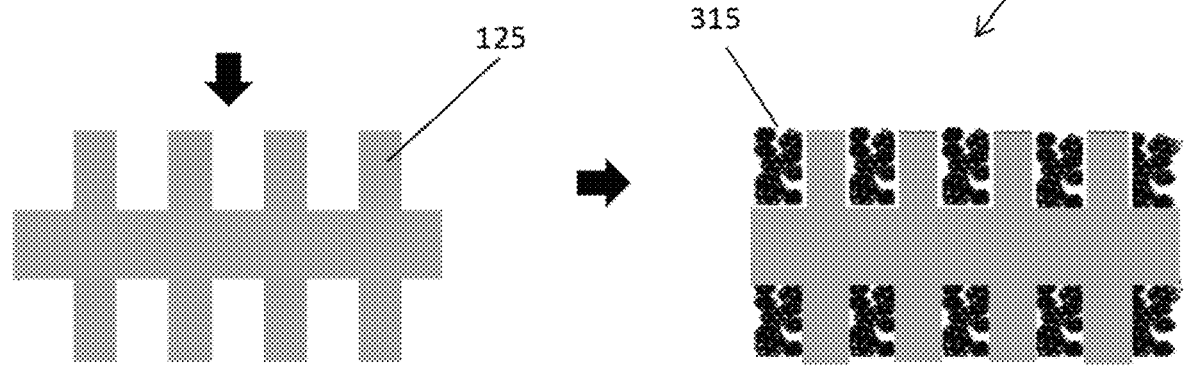

In FIG. 3D, sections 380A and 380B show sections similar to sections 370A and 370B (of FIG. 3C), using two templates. In particular, in sections 380A and 380B, either two two-sided templates 352a/352b, or two one-sided templates 362a/362b are pressed against two faces of the solid ionomer 310 to generate the ionomer membrane 125. While not illustrated, in at least some embodiments, a two-sided template 352 may be pressed against one side of the solid ionomer 310, while a one-sided template 362 may be pressed against a second side of the solid ionomer 310.

In at least some embodiments, the solid ionomer 310 is hot pressed to the template(s). For example, the solid ionomer 310 and the template(s) may be placed between two metal plates. The metal plates may then be placed in a hot press pre-heated to a desired temperature. Pressure may then be applied and set to a desired pressure. After a desired amount of time, the metal plates [between which are the ionomer membrane 125 and the template(s)], may be removed from the hot press and allowed to cool to room temperature. The hot pressing may occur at various temperatures and pressures, and for various durations of time. Generally, the higher the temperature and the pressure, the shorter the time to achieve desired height of protrusions. In at least some embodiments, the hot pressing may occur at about 120° C. to about 175° C. In at least some embodiments, the hot pressing may occur at about 1000 psi to about 7500 psi. In at least some embodiments, the hot pressing may be performed for about 2 minutes to about 90 minutes. In an example, the hot pressing may occur at about 120° C. and about 2000 psi, for about 20 minutes. In another example, the hot pressing may occur at about 150° C. and about 1000 psi, for about 15 minutes. Alternatively, a continuous roller-based pressing may be used to pattern the membrane surface.

In at least some embodiments, the solid ionomer 310 is pressed onto a pristine template to generate the ionomer membrane 125. As used in this context, "pristine" means there are not modifications made to the template.

After the ionomer membrane 125 is formed (e.g., after the ionomer membrane 125 and the template(s) are allowed to cool in the aforementioned hot pressing example), the template(s) is removed (304) from the ionomer membrane 125 (either the ionomer membrane 125 including one side of protrusions in FIG. 3C, or the ionomer membrane 125 including two sides of protrusions in FIG. 3D). The one or two templates may be removed by detaching or dissolving the template(s).

A template may be a single-use template. Alternatively, a template may be a reusable template. A single-user or reusable template may be physically removed from the ionomer membrane 125. Moreover, a single-use template may be dissolved to remove the single-use template from the ionomer membrane 125. In at least some embodiments, the single-use template may be dissolved by immersing the ionomer membrane/template(s) construct (of sections 370B and 380B of FIGS. 3C and 3D, respectively) in an etchant. Example etchants include, but are not limited to, sodium hydroxide solution, phosphoric acid solution, a mixture of hydrochloric acid and hydrogen peroxide, and dichloro methane. The etchant may have varying concentrations. In at least some embodiments, the etchant may have a concentration from about 0.05 M to about 3 M. As an example, a template made of AAO may be dissolved via immersion in sodium hydroxide solution and phosphoric acid solution.

Section 380C shows the ionomer membrane 125. After the template(s) is removed from the ionomer membrane 125, a filler material(s) 315 may be added (306) to one or more voids of the ionomer membrane 125 (conceptually illustrated in sections 370D and 380D of FIGS. 3C and 3D, respectively). Example filler materials include, but are not limited to, Pt, Pd, Co, Ni, Au, Ag, and Ir, and alloys thereof supported on catalyst supports including various types of carbon (e.g., Vulcan, high surface area carbon, graphitized carbon, and/or acetylene black).

The function of the filler material(s) 315 may depend on the composition of the filler material(s) 315. A filler material may, in at least some embodiments, provide enhanced gas transport and/or enable improved water management. In an example, wettability of the filler material(s) 315 may depend on an amount of $SiO_2$ particles present in the filler material(s) 315. In another example, the filler material(s) 315 may include $IrO_2$, which is a catalyst for water electrolysis, enabling utilization for reversible fuel cell operation.

The filler material(s) 315 may be deposited into the void(s) of the ionomer membrane 125 using various techniques. Example techniques include, but are not limited to, painting with a brush; rod coating by sliding a smooth, grooved, or wire-wound bar over the surface; spraying through a nozzle; slot-die coating, gravure coating, or other coating techniques.

Solution-Based Fabrication of Ionomer Membranes

Figure 4A:
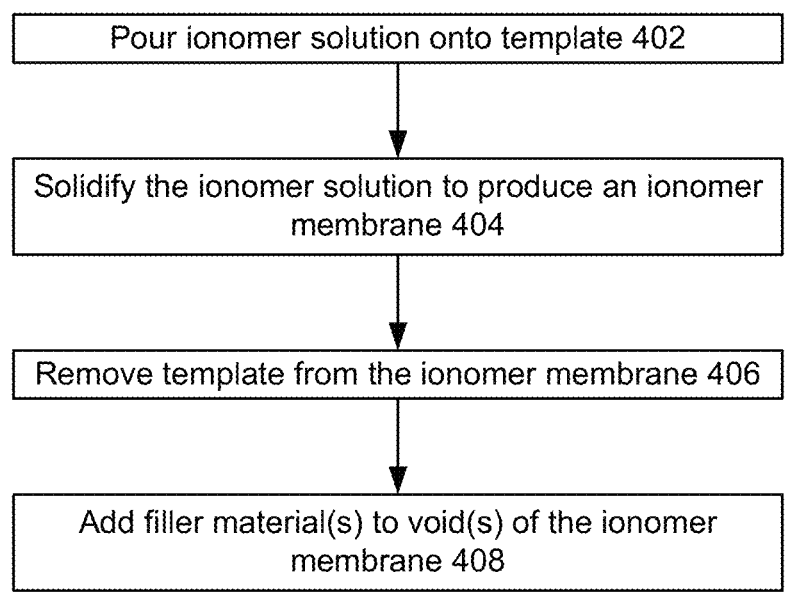

FIGS. 4A-4B illustrate an example of how the ionomer membrane 125 may be fabricated from a solution including one or more ionomers (referred to herein as an "ionomer solution"). To start, a prepared or obtained ionomer solution 405 is poured (402) onto a template, resulting in the template being impregnated with the ionomer solution 405 (see sections 410 and 420 of FIG. 4B). In the example of FIG. 4B, a two-sided template 352 is used. However, one skilled in the art will appreciate that a one-sided template may be used without departing from the present disclosure.

As noted above, the ionomer solution 405 may include one or more ionomers. Example ionomers that may be included in the solution include, but are not limited to, PFSA ionomer, PFIA ionomer, hydrocarbon acidic ionomer, and alkaline ionomer.

The ionomer solution 405 may have one or more solvents. The ionomer solution 405 may include water and/or one or more organic solvents. Example organic solvents include, but are not limited to, 1-propanol, 2-propanol, methanol, ethanol, glycerol, ethylene glycol, 1,2-propanediol, 1,3,-propanediol, and N-methyl-2-pyrrolidone. Art-known/industry-known solvents may be used to create the ionomer solution 405. The concentration of the ionomer in the ionomer solution 405 may be about 5 wt % to about 20 wt % in water:isopropyl alcohol mixture (1:1 wt %).

In at least some embodiments, the ionomer solution 405 may be a commercially available ionomer solution. Examples of commercially available ionomer solutions include, but are not limited to, Nafion™ (a sulfonated tetrafluoroethylene based fluoropolymer-copolymer produced by The Chemours Company), Aquivion® (a short-side-chain copolymer of tetrafluoroethylene and the sulfonyl fluoride vinyl ether (SFVE) $CF_2=CF_2-O-(CF_2)_2-SO_2F$, produced by Solvay Specialty Polymers), and Liquion™ (Ion Power, Inc.).

In at least some embodiments, the ionomer solution 405 may be cast onto the two-sided template 352, and the holes of the two-sided template 352 may be filled by capillary wetting and gravity. Optionally, a vacuum may be applied to a side of the two-sided template 352 (e.g., the bottom of the two-sided template 352 illustrated in FIG. 4B, which may also be referred to as a side of the two-sided template 352 opposite where the ionomer solution 405 is poured) to accelerate the filling and improve the degree of filling.

After the ionomer solution 405 is poured onto the two-sided template 352, the ionomer solution 405 is solidified (404) into the ionomer membrane 125 (represented by a transition from section 420 to section 430 in FIG. 4B). To solidify, the ionomer solution 405 may be dried and annealed while in the two-sided template 352. Depending upon characteristics of the ionomer solution 405 and environment conditions, the ionomer solution 405 may be dried and annealed for less than 1 minute, at least 1 minute, at least 5 minutes, at least 10 minutes, at least 15 minutes, at least 20 minutes, at least 25 minutes, at least 30 minutes, at least 35 minutes, at least 40 minutes, at least 45 minutes, at least 50 minutes, at least 55 minutes, at least 1 hour, at least 2 hours, at least 3 hours, or at least 24 hours. In an example, the ionomer solution 405 may be dried in air at room temperature for about 24 hours, followed by annealing in a vacuum oven for about 2 hours at about 140° C.

After the ionomer membrane 125 is produced, the two-sided template 352 is removed (406) from the ionomer membrane 125 as described above with respect to step 304. Such removal is represented by a transition from section 430 to section 440 of FIG. 4B.

After the two-sided template 352 has been removed, a filler material(s) 315 may be added (408) to one or more voids of the ionomer membrane 125. Such is represented by a transition from section 440 to section 450 of FIG. 4B. Example filler material(s) 315, and ways in which the filler material(s) 315 may be added, are described herein above.

EXAMPLES

Scanning Electron Microscopy

Figure 5B:
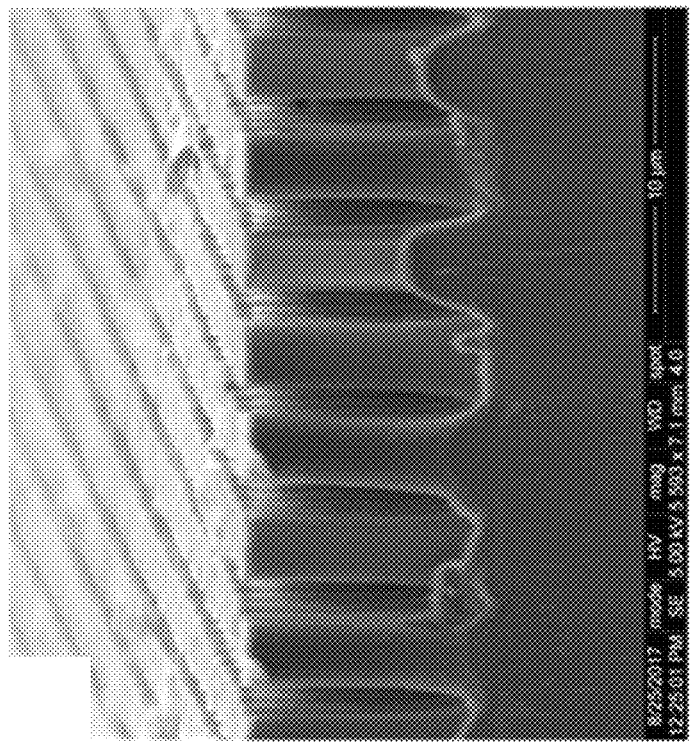
FIG. 5B is a higher magnification SEM image showing the aspect ratio of protrusions of the ionomer membrane of FIG. 5A, according to embodiments of the present disclosure.
Figure 5A:
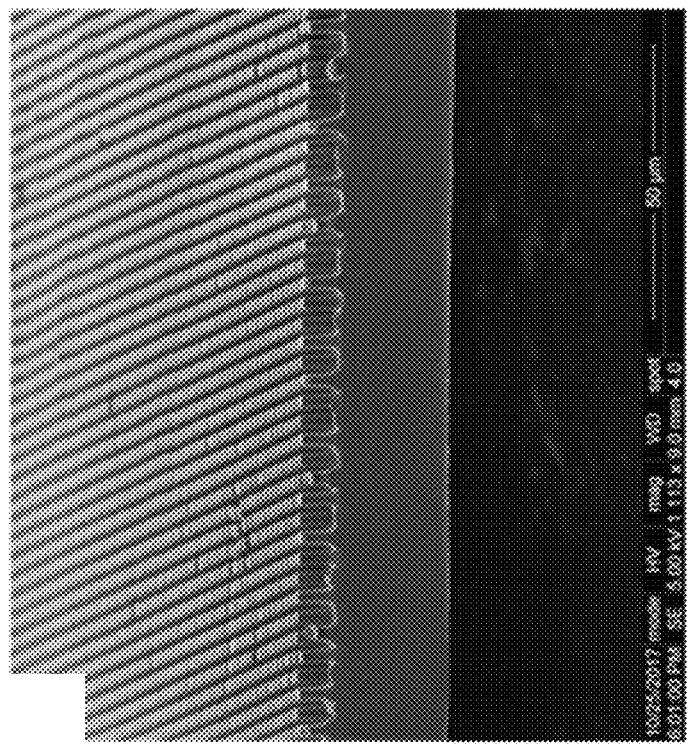
FIG. 5A is a scanning electron microscopy (SEM) image of an ionomer membrane, according to embodiments of the present disclosure.

FIG. 5A is a cross-section of a scanning electron microscopy (SEM) image showing an ionomer membrane according to the present disclosure. FIG. 5B is a higher magnification SEM image showing the aspect ratio of protrusions of the ionomer membrane of FIG. 5A. The aspect ratio of the protrusions of an ionomer membrane of the present disclosure can be controlled by pressing parameters including, but not limited to, temperature, pressure, cationic form, plasticizer content, and time. An advantage of the methodologies of the present disclosure is that any thermoplastic polymer membrane can be used and aspect ratios of about 1:1 to about 60:1 can be synthesized. Higher aspect ratios lead to higher surface area or surface roughness, which is beneficial due to increased interface between ionomer and filler material(s).

Polarization Curve Comparisons

Figures 6A, 6B:
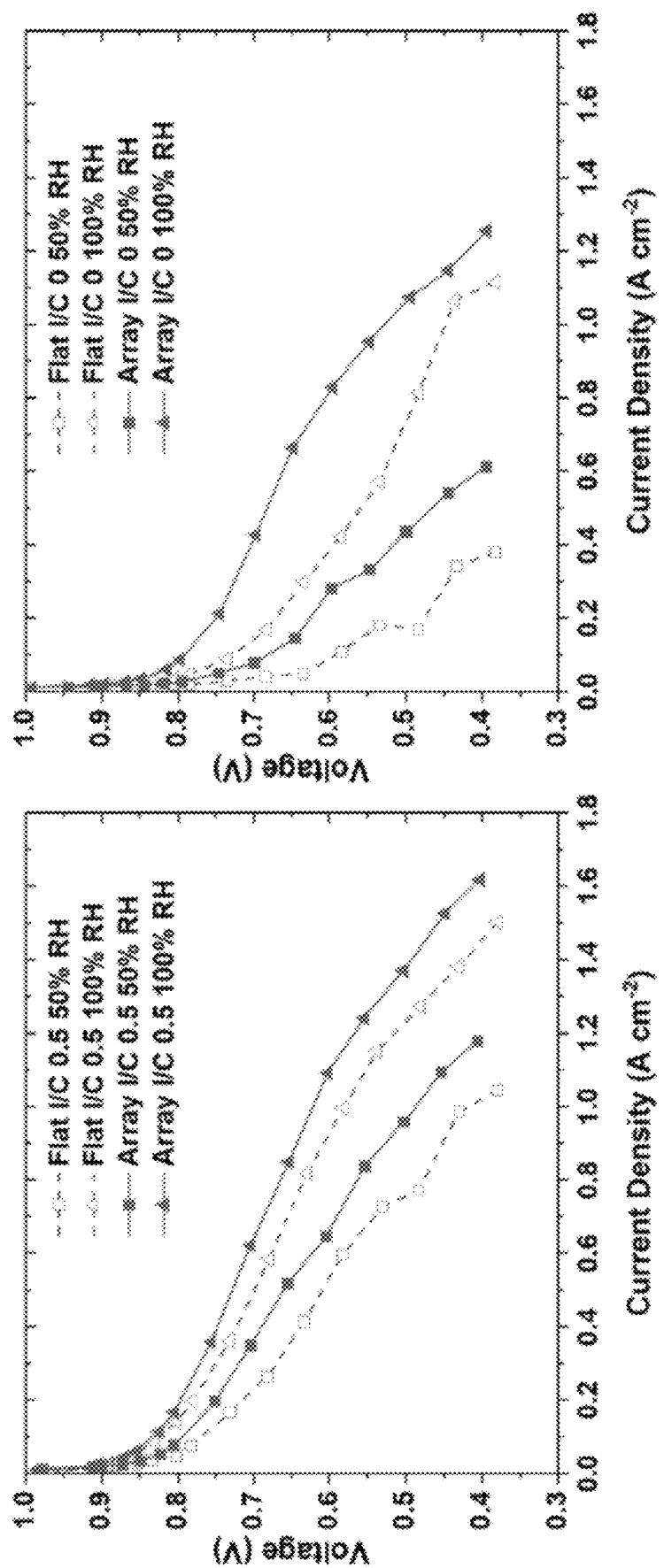
FIG. 6A is a polarization curve comparison of an arrayed ionomer membrane and a conventional flat membrane, according to embodiments of the present disclosure.
FIG. 6B is a polarization curve comparison of an arrayed ionomer membrane and a conventional flat membrane, according to embodiments of the present disclosure.

FIG. 6A is a polarization curve comparison of an arrayed ionomer membrane of the present disclosure and a conventional flat membrane. In FIG. 6A, the ionomer to carbon ratio (I/C) is 0.5 for the catalyst domains of both the arrayed and flat membranes. FIG. 6B is likewise a polarization curve comparison of an arrayed ionomer membrane of the present disclosure and a conventional flat membrane. However, in FIG. 6B, the I/C is 0 for the catalyst domains of both the arrayed and flat membranes. It was observed that the ionomer membranes of the present disclosure improved performance at both 100% and 50% relative humidity compared to the conventional flat membranes. Such demonstrates viability of ionomer membranes of the present disclosure in fuel cells and related devices.

Figure 7A:
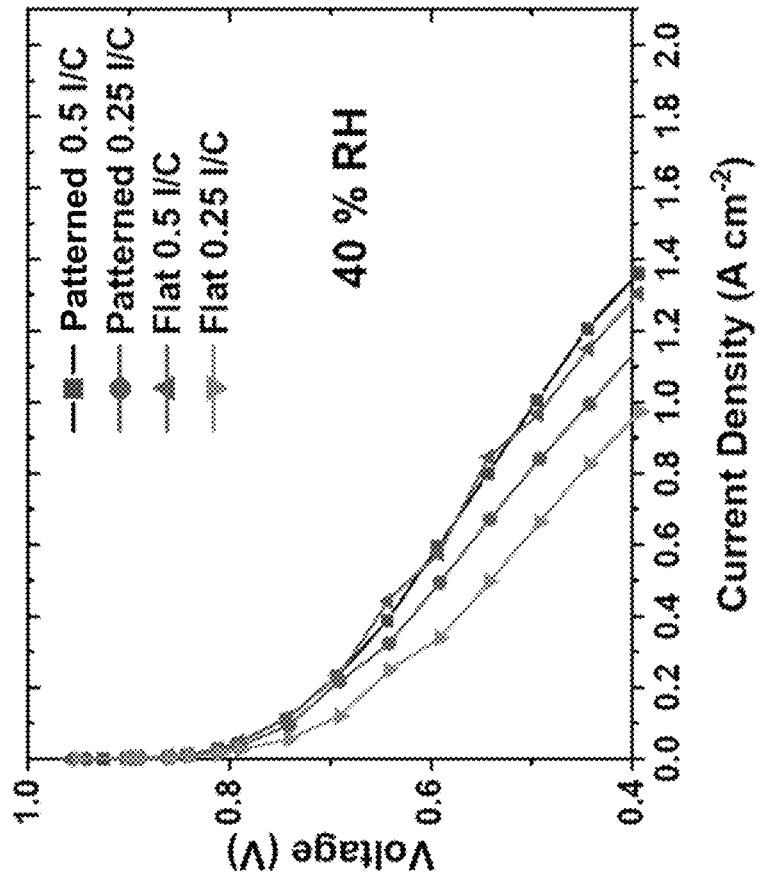
FIG. 7A is a polarization curve comparison of an arrayed ionomer membrane and a conventional flat membrane, according to embodiments of the present disclosure.
Figure 7B:
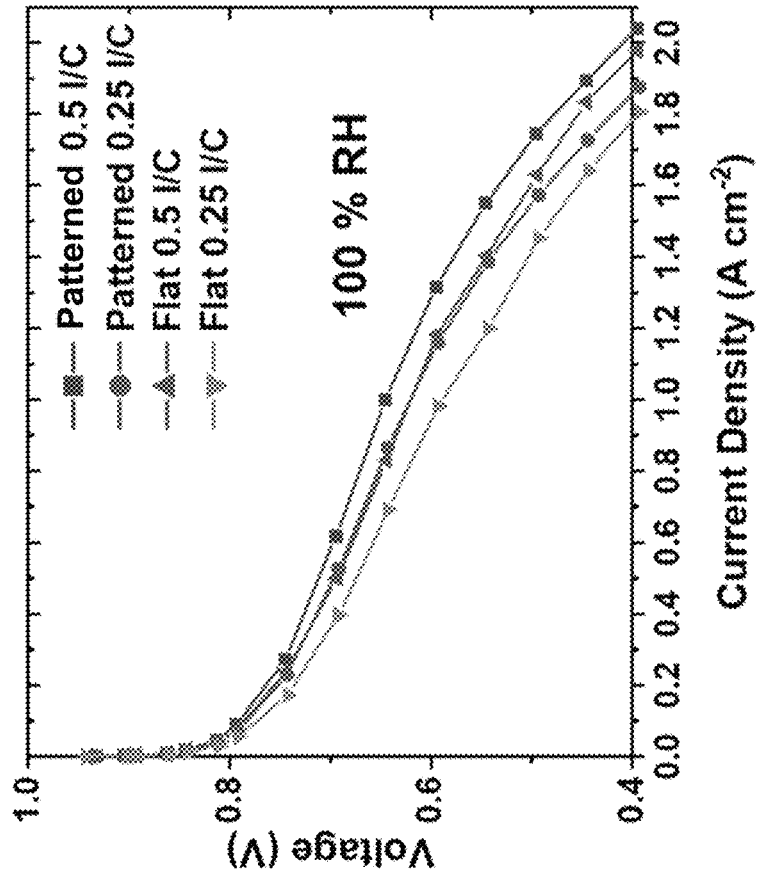
FIG. 7B is a polarization curve comparison of an arrayed ionomer membrane and a conventional flat membrane, according to embodiments of the present disclosure.

FIGS. 7A-7B are polarization curve comparisons of arrayed ionomer membranes and conventional flat membranes. The arrayed ionomer membranes (labeled "patterned" in FIGS. 7A-7B) had protrusions with a diameter of 2 μm and a height of 5 μm. The catalyst loading was 50 μg cm$^{-2}$ with 0.5 I/C and 0.25 I/C. The fuel cell was operated at 80° C. and 150 kPa total pressure with inlet gases at 100% relative humidity (FIG. 7A) and 40% relative humidity (FIG. 7B). The arrayed ionomer membrane exhibited higher performance than the flat conventional membrane for both I/C at 100% relative humidity. At 40% relative humidity, the arrayed ionomer membrane showed similar performance with the flat conventional membrane at 0.5 IC and, upon reduction of the I/C, the arrayed ionomer membrane showed higher performance.

Overview of Terms and Abbreviations

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims, are to be understood as being modified by the term "about." Accordingly, unless otherwise indicated, implicitly or explicitly, the numerical parameters set forth are approximations that can depend on the desired properties sought and/or limits of detection under standard test conditions/methods.

While the present disclosure has been particularly described in conjunction with specific examples, it is evident that many alternatives, modifications, and variations will be apparent to those skilled in the art in light of the foregoing description. It is therefore contemplated that the appended claims will embrace any such alternatives, modifications, and variations as falling within the true spirit and scope of the present disclosure.

What is claimed is:

1. An ionomer membrane A structure for use in fuel cells and related devices, comprising:
   a gas diffusion layer;
   an ionomer membrane comprising:
      a backbone portion;
      a plurality of protrusion pillars formed on the backbone portion, wherein the plurality of protrusion pillars form at least one void between the plurality of protrusion pillars, wherein the at least one void exposes at least one surface area of the backbone portion, wherein a first protrusion pillar of the plurality of protrusion pillars has a width of about 100 nm to about 30,000 nm, and a height of about 0.5 μm to about 200 μm, wherein the plurality of protrusion pillars is adjacent to the gas diffusion layer; and
      at least one filler material comprising a catalyst support that comprises carbon and metal particles, and wherein the at least one filler material is located only within the at least one void covering the at least one surface area of the gas diffusion layer, wherein the at least one filler material comprises an ionomer to carbon ratio (I/C) of 0.5 or less, and wherein the at least one filler material is not part of a cathode or anode, and wherein the plurality of protrusions positioned adjacent to the gas diffusion layer is configured to enhance protonic conductivity and reduce an amount of the ionomer in comparison to a flat ionomer membrane.

2. The structure of claim 1, wherein the at least one filler material further comprises at least one of $SiO_2$ or $IrO_2$.

3. The structure of claim 2, wherein the at least one filler material comprises a catalyst material supported on the catalyst support.

4. The structure of claim 1, wherein the metal particles comprise at least one of platinum (Pt), Pt alloy, gold (Au), Au alloy, silver (Ag), Ag alloy, iridium (Ir), Ir alloy, palladium (Pd), Pd alloy, cobalt (Co), Co alloy, nickel (Ni), or Ni alloy.

5. The structure of claim 1, wherein a first protrusion pillar of the plurality of protrusion pillars has a height to width aspect ratio of about 1:1 to about 60:1.

* * * * *